United States Patent [19]

Shiobara et al.

[11] Patent Number: 4,859,722

[45] Date of Patent: Aug. 22, 1989

[54] EPOXY RESIN COMPOSITION

[75] Inventors: Toshio Shiobara; Kazutoshi Tomiyoshi, both of Annaka, Japan

[73] Assignee: Shin-Etsu Chemical Co., Ltd., Tokyo, Japan

[21] Appl. No.: 168,943

[22] Filed: Mar. 16, 1988

[30] Foreign Application Priority Data

Mar. 16, 1987 [JP] Japan .................................. 62-61631

[51] Int. Cl.$^4$ ............................................. C08L 63/00
[52] U.S. Cl. .................................... 523/433; 523/427; 523/435; 523/436; 523/428; 523/429; 523/445; 523/457; 523/466; 525/476; 528/27; 528/29
[58] Field of Search ................ 525/476, 474; 523/433, 523/427, 435, 436, 428, 429; 528/29, 25, 27

[56] References Cited

U.S. PATENT DOCUMENTS 3,407,169  10/1968  Johnson et al. ..................... 525/476
4,720,515  1/1988  Iji et al. ............................ 523/435

Primary Examiner—John C. Bleutge
Assistant Examiner—R. Dean, Jr.
Attorney, Agent, or Firm—Birch, Stewart, Kolasch & Birch

[57] ABSTRACT

An epoxy resin composition which comprises a curable epoxy resin, a hardener, and a block copolymer formed by the reaction of a triphenol-alkane type resin or a polymer thereof with a specific organopoly-siloxane. The composition provides a cured product having a high glass transition point, a low coefficient of expansion, good crack resistance, and is less likely to exert stress to the semiconductor devices. It exhibits distinct characteristics when used as a sealing compound for semiconductor devices, especially in the case where the element is bonded directly to a printed circuit board or heat sink. It is very unlikely that a semiconductor device sealed with it would become warped.

17 Claims, 1 Drawing Sheet

EPOXY RESIN COMPOSITION

BACKGROUND OF THE INVENTION

1. Field of the Invention

The present invention relates to an epoxy resin composition which provides a cured product having a high glass transition point, an extremely low coefficient of expansion, good crack resistance, and low stress. More particularly, it is concerned with an epoxy resin composition suitable for use as an encapsulator for semiconductor devices.

2. Description of the Prior Art

An epoxy resin composition which is composed of a curable epoxy resin, a curing agent, and a variety of additives is used for encapsulating semiconductor devices because it is superior to other thermosetting resins in moldability, adhesion, electrical properties, mechanical properties, and moisture resistance. However, there is presently a need for it to meet new requirements arising from the recent advance in semiconductor devices. With the development of smaller and thinner electronic machines and equipment, the package of semiconductor devices has become diversified. On the other hand, the electronics technology has produced semiconductor devices in which semiconductor elements are bonded directly to a printed circuit board or heat sink. Such semiconductor devices encounter some problems when encapsulated with a conventional epoxy resin composition because of the difference in the coefficient of thermal expansion between the printed circuit board and the epoxy resin composition. The difference in the coefficient of thermal expansion exerts a great stress on the semiconductor element, resulting in cracking and deformation, which would deteriorate the performance and appearance of the element.

In order to solve this problem, an epoxy resin composition composed of a curable epoxy resin and organopolysiloxane (Japanese patent Laid-open No. 129246/1981) and an epoxy resin composition incorporated with a block copolymer composed of an aromatic polymer and organopolysiloxane (Japanese patent Laid-open No. 21417/1983), has been proposed. These epoxy resin compositions produce a lower level of stress than the conventional ones. However, there are some instances where even these new epoxy resin compositions do not meet the severe requirements for an encapsulator of sophisticated semiconductor devices. Thus there still is a demand for a new encapsulator which is more reliable and less likely to exert stress to the semiconductor element. The present invention was completed under the above-mentioned circumstance.

SUMMARY OF THE INVENTION

It is an object of the present invention to provide a new epoxy resin composition which has good flowability and provides a cured product having a high glass transition point, a low coefficient of thermal expansion, good crack resistance, and less likely to exert stress on the semiconductor element.

To achieve the above-mentioned object, the present inventors carried out a series of researchers which led to the finding that an epoxy resin composition incorporated with a copolymer formed by the reaction of a compound represented by the formula (1) below or an oligomer thereof with a specific organopolysiloxane represented by the formula (2) below, provides a cured product having a glass transition point 10° to 20° C. higher than that of a conventional cured product, a lower coefficient of thermal expansion, good crack resistance, and less likely to exert stress to the semiconductor devices. This epoxy resin composition exhibits its distinct characteristics when used as an encapsulator for semiconductor devices, especially in the case where the element is bonded directly to a printed circuit board or heat sink. In other words, it is very unlikely that a semiconductor device encapsulated with it would become warped. Thus the epoxy resin composition of the present invention can be advantageously applied to semiconductor devices of DIP type, flat pack type, PLCC type, and SO type, and also to semiconductor devices in which the element is bonded directly to a printed circuit board or heat sink.

According to the present invention, there is provided an epoxy resin composition which comprises a curable epoxy resin, a curing agent, and a block copolymer formed by the reaction of a compound represented by the formula (1) below or an oligomer thereof,

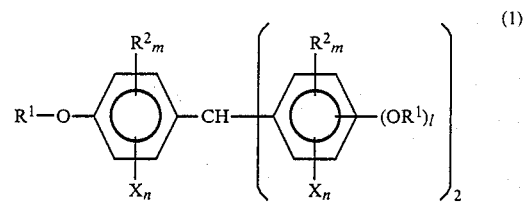

(where $R^1$ denotes a hydrogen atom,

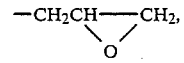

or a monovalent organic group including an alkenyl group; $R^2$ denotes a monovalent hydrocarbon group having 1 to 10 carbon atoms of the same or different kind; X denotes a halogen atom; l denotes an integer of 1 or 2; m and n each denote an integer of 0 to 2; and $1+m+n \leq 5$) with an organopolysiloxane represented by the formula (2) below,

(where $R^3$ denotes a hydrogen atom, halogen atom, hydroxyl group, alkoxyl group, or substituted monovalent hydrocarbon group; $R^4$ denotes a monovalent organic group of the same or different kind; $0.001 \leq a \leq 2$, $1 \leq b < 3$, and $1.001 \leq a+b \leq 3$.)

DETAILED DESCRIPTION OF THE INVENTION

Figure 1:
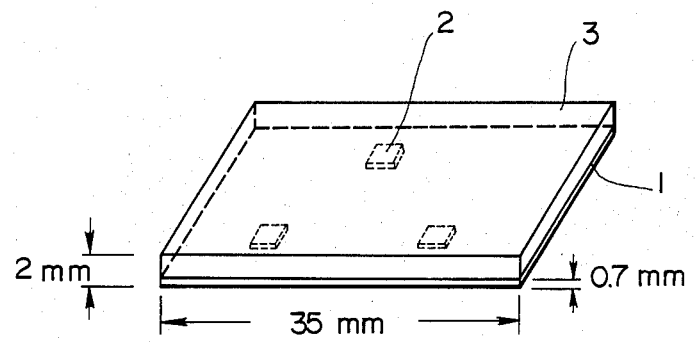
FIG. 1 is a schematic perspective view of a semiconductor device used to measure the amount of warpage.
Figure 2:
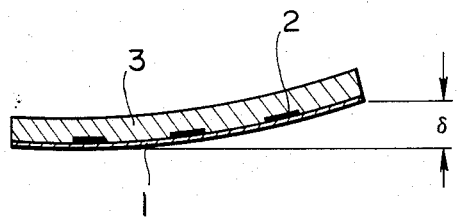
FIG. 2 is a sectional view of a warped semiconductor device.

The present invention will be described in more detail in the following.

The epoxy resin composition of the present invention is composed of a curable epoxy resin, a curing agent, and a block copolymer formed by the reaction of a compound of the formula (1) or an oligomer thereof with an organopolysiloxane of the formula (2).

One component used for preparing the copolymer of the present invention is a compound represented by the formula (1) below or an oligomer thereof.

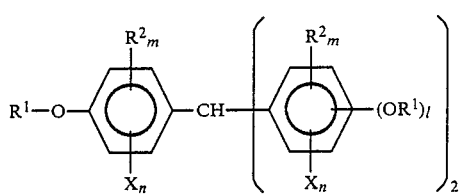

(where $R^1$ denotes a hydrogen atom,

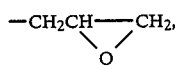

or a monovalent organic group including an alkenyl group; $R^2$ denotes a monovalenyt hydrocarbon group having 1 to 10 carbon atoms of the same or different kind; X denotes a halogen atom; $l$ denotes an integer of 1 or 2; m and n each denote an integer of 0 to 2; and $l+m+n \leq 5$)

Examples of the $R^1$, which is a monovalent organic group including an alkenyl group, include

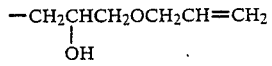

and $-CH_2CH=CH_2$.

Examples of the $R^2$, which is a monovalent hydrocarbon group, include a methyl group, ethyl group, propyl group, allyl group, i-propyl group, t-butyl group, octyl group, and nonyl group.

The oligomer of the compound (1) may preferably be a dimer, a trimer or a tetramer of the compound (1).

Examples of the compound (1) and the oligomer thereof include the following compounds.

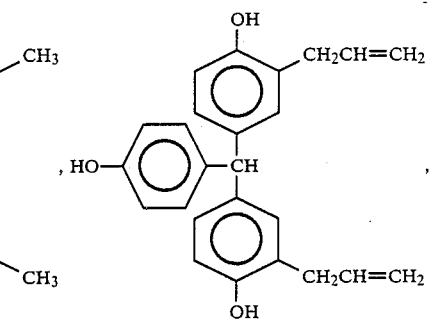

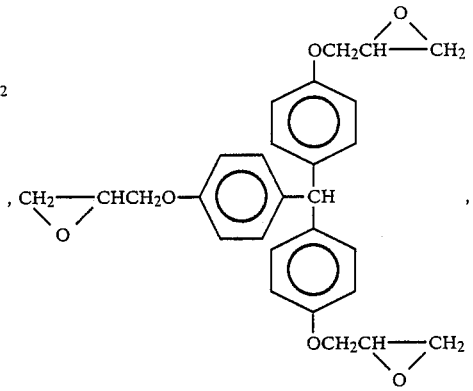

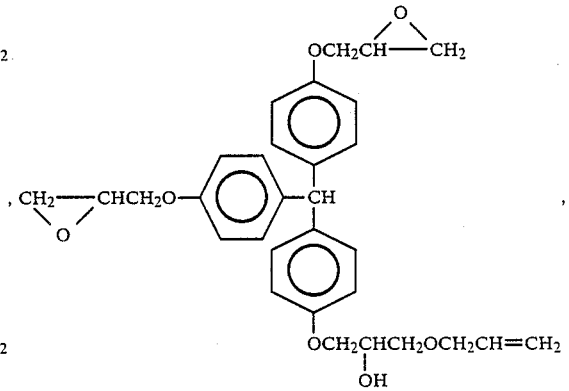

-continued

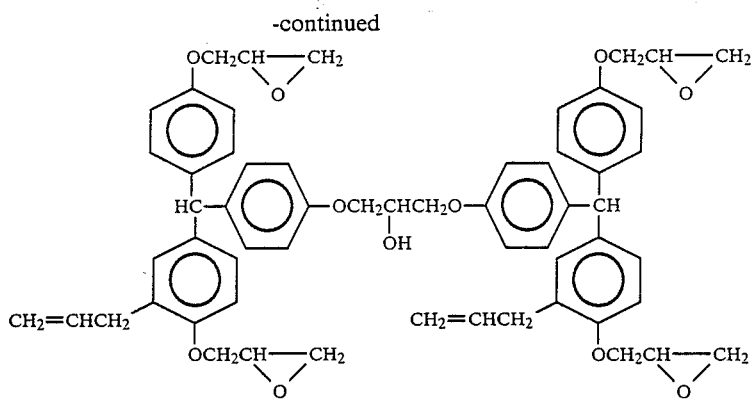

These compounds can be synthesized according to the process disclosed in U.S. Pat. No. 4,394,496.

Another component used for preparing the copolymer is an organopolysiloxane represented by the formula (2) below.

$$R^3{}_a R^4{}_b SiO_{(4-[a+b])/2} \qquad (2)$$

(where $R^3$ denotes a hydrogen atom, halogen atom, hydroxyl group, alkoxy group having 1 to 5 carbon atoms, or substituted monovalent hydrocarbon group having 1 to 10 carbon atoms; $R^4$ denotes a monovalent organic group having 1 to 10 carbon atoms of the same or different kind; $0.001 \leq a \leq 2$, $1 \leq b < 3$, and $1.001 \leq a + b \leq 3$.)

Examples of the $R^3$, which is a substituted monovalent hydrocarbon group, include:

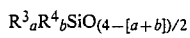

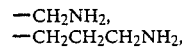

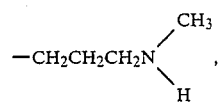

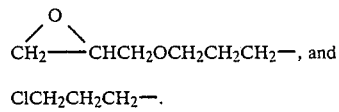

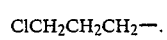

Examples of the $R^4$, which is a monovalent organic group, include a methyl group, ethyl group, phenyl group, and benzyl group.

The organopolysiloxane represented by the formula (2) has at least one $\equiv SiR^3$ group per molecule. Examples of such a compound include:

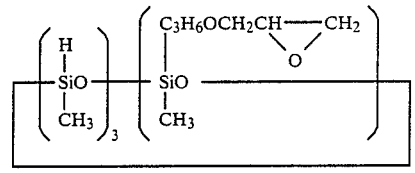

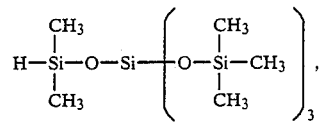

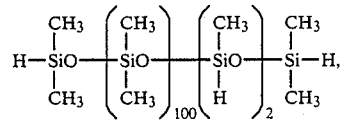

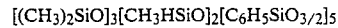

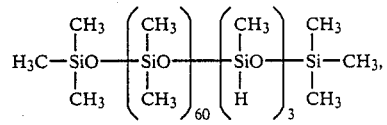

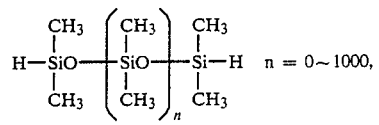
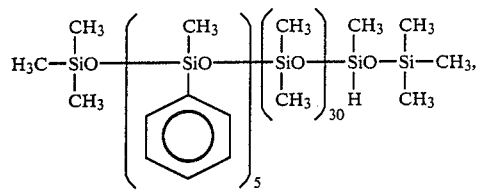
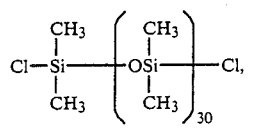
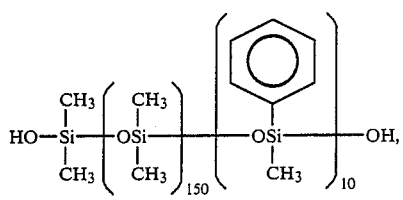
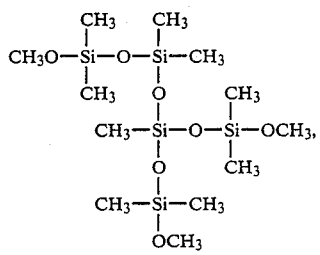
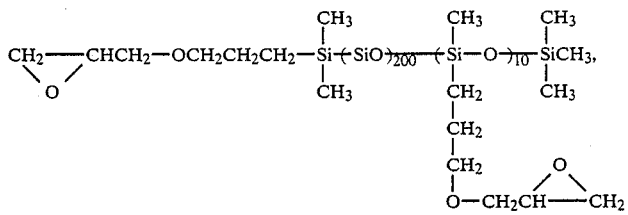
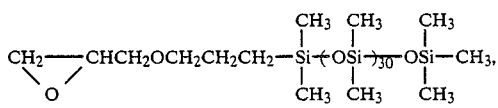
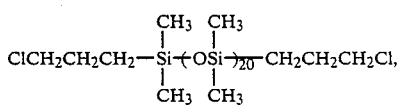
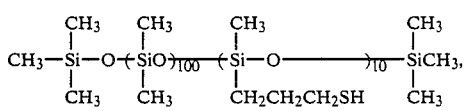

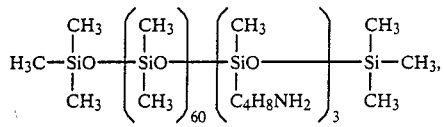
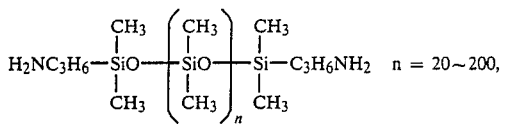  n = 20~200,
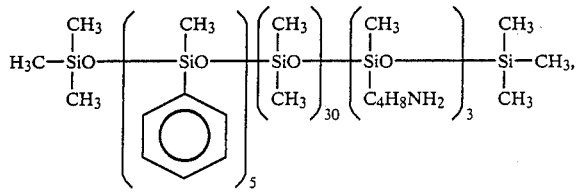
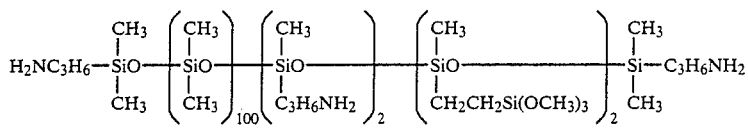
The copolymer used in the present invention is prepared from a compound represented by the formula (1) or an oligomer thereof and an organopolysiloxane represented by the formula (2) through the reaction shown in the following.
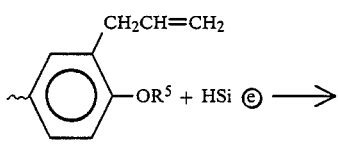 (1)
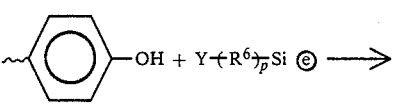 (2)
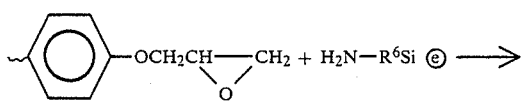 (3)
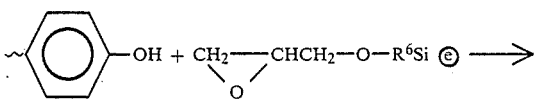 (4)
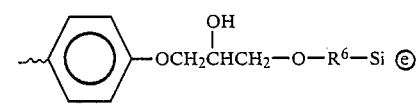
 (5)
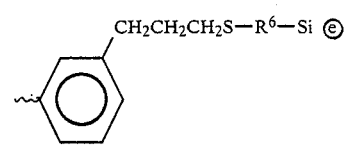
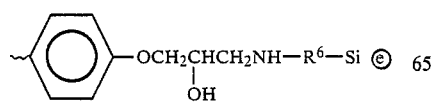 (6)
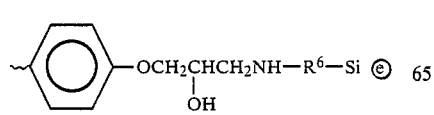
In the above equations, $R^5$ represents: —H and
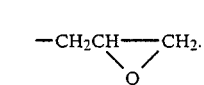.

Y represents a halogen atom, hydroxyl group, and alkoxyl group; $R^6$ represents a divalent hydrocarbon group such as methylene, ethylene, and propylene: and p represents 0 or 1.

The block copolymer mentioned above is incorporated into an epoxy resin composition composed of a curable epoxy resin and a curing agent. The amount of the copolymer may be 1 to 100 parts by weight, preferably 2 to 60 parts by weight, for 100 parts by weight of the total amount of the epoxy resin and curing agent. With an amount less than 1 part by weight, the copolymer is not effective in the improvement of the epoxy resin composition (such as glass transition point, crack resistance, an flowability). With an amount in excess of 100 parts by weight, the copolymer may lower the mechanical strength of the epoxy resin composition.

According to the present invention, the curable epoxy resin is one which has two or more epoxy groups per molecule. It is not specifically limited in molecular structure and molecular weight so long as it is capable of curing with a curing agent mentioned later. Any of the known ones can be used. They include, for example, epoxy novolak resins such as one synthesized from epichlorohydrin and bisphenol, triphenol-alkane type epoxy resin or polymer thereof, alicyclic epoxy resin, and epoxy resins having halogen atoms (such as chlorine and bromine). These epoxy resins may be used alone or in combination with one another.

The above-mentioned epoxy resin may be used in combination with a monoepoxy compound according to need. Examples of the monoepoxy compound include styrene oxide, cyclohexene oxide, propylene oxide, methylene glycidyl ether, ethyl glycidyl ether, phenyl glycidyl ether, allyl glycidyl ether, octylene oxide, and dodecene oxide.

Examples of the curing agent include amine-type curing agent such as diaminodiphenyl-methane, diaminodiphenylsulfone, and metaphenylenediamine; acid anhydride-type curing agents such as phthalic anhydride, pyromellitic anhydride, and benzophenone tetracarboxylic anhydride; phenol novalac-type curing agents having two or more hydroxyl groups per molecule such as phenol novolak and cresol novolak; and triphenol alkanes.

The curing agent may be used in combination with an accelerator which promotes the reaction of the curing agent with the epoxy resin. Examples of the accelerator include imidazole and derivatives thereof, tertiary amine derivative, phosphine derivatives, and cycloamidine derivatives. The curing agent and accelerator may be used in conventional amounts, although the amount of the curing agent may preferably be 20 to 100% based on the equivalent of the epoxy group of the epoxy resin.

The epoxy resin composition of the present invention may be incorporated with an inorganic filler. It may be selected from a wide variety according to the application of the epoxy resin composition. Examples of such an inorganic filler include natural silica (crystalline or amorphous silica), synthetic high-purity silica, synthetic spherical silica, talc, mica, silicon nitride, boron nitride, and alumina. They may be used alone or in combination with one another. The amount of the inorganic filler is not specifically limited. It should preferably be 100 to 1000 parts by weight for 100 parts by weight of the total amount of epoxy resin and curing agent. With an amount less than 100 parts by weight, the resulting epoxy resin composition may decrease in stress and have low crack resistance. With an amount in excess of 1000 parts by weight, the resulting epoxy resin composition has such poor flowability that the inorganic filler is not readily dispersed.

The epoxy resin composition of the present invention may be incorporated with a variety of additives according to its intended use and application. Examples of the additives include waxes, fatty acids (e.g., stearic acid), release agent (e.g., metal salt), pigment (e.g., carbon black), dye, antioxidant, flame retardant, and surface treating agent (e.g., γ-glycidoxypropyltrimethoxysilane).

The epoxy resin composition of the present invention should be prepared such that the cured product has a coefficient of expansion smaller than $2.0 \times 10^{-5}/°C.$, preferably smaller than $1.9 \times 10^{-5}/°C.$, at 25° to 180° C. The epoxy resin composition is used for encapsulating semiconductor devices of such type that the semiconductor elements are bonded directly to a printed circuit board. It prevents the semiconductor devices from warping, twisting, or cracking. Thus it prevents the semiconductor devices from becoming deteriorated in performance.

The epoxy resin composition of the present invention is prepared by mixing the above-mentioned components at 70° to 95° C. using a kneader, roll mixer, extruder, or the like. The resulting mixture is cooled and crushed. The sequence of adding the components is not specifically limited.

As mentioned above, the epoxy resin composition of the present invention is composed of a curable epoxy resin, a curing agent, and a block copolymer obtained from the reaction of a compound represented by the formula (1) or an oligomer thereof with an organopolysiloxane represented by the formula (2). It provides a cured product having good mechanical properties (such as flexural strength and flexural modulus), a low coefficient of expansion, a high glass transition point, and good crack resistance. By virtue of this feature, it is advantageously used for encapsulating semiconductor devices such as ICs and LSIs of DIP type, flat pack type, PLCC type and SO type, transistors, thyristors and diodes. It is especially suitable for semiconductor devices of such type that the semiconductor element is bonded directly to a heat sink or printed circuit board. The semiconductor devices encapsulated with the epoxy resin composition of the present invention are not very susceptible to warpage and have extremely good dimensional stability. In addition, the composition of the present invention may also be applied to hydrid ICs of full mold type.

For encapsulating semiconductive devices, conventionally employed molding techniques such as, for example, transfer molding, injection molding and casting techniques may be used. Preferably, the molding temperature for the epoxy resin composition is in the range of from 150° to 180° C. and the post curing is effected at a temperature of from 150° to 180° C. for 2 to 16 hours.

To further illustrate the present invention, and not intended to be limited thereby, the following examples are provided. The block copolymers used in the examples and comparative examples were prepared as shown in the following production examples.

PRODUCTION EXAMPLES 1 TO 4

In a 500-ml four-neck flask equipped with a reflux condenser, thermometer, stirrer, and dropping funnel were placed 75 g of the organic polymer (a compound (1) type) as shown in Table 1, 0.10 g of chloroplatinic acid solution (containing 2% platinum and modified with 2-ethylhexanol), 100 g of methyl isobutyl ketone, and 200 g of toluene. After complete dissolution of the organic polymer, reaction was carried out by azeotropic dehydration for 1 hour. To the reaction product was added 25 g of an organopolysiloxane represented by the formula below from the dropping funnel over 2 hours. Reaction was continued for 6 hours under refluxing. The reaction product was washed with water and the solvent was removed by distillation under reduced pressure. Thus there were obtained four block copolymers as shown in Table 1.

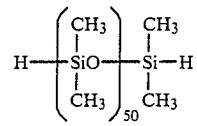

TABLE 1

| Production Example | 1 | 2 | 3 | 4* |
|---|---|---|---|---|
| Organic polymer | i | ii | iii | iv |
| Block copolymer | I | II | III | IV |
| Properties | Brown opaque solid | Brown opaque solid | Brown opaque solid | Brown clear solid |
| Viscosity of 50% MIBK solution (cs. 25° C.) ** | 28 | 32 | 40 | 25 |
| Ignition loss (%, 150° C./1 hr) | 0.84 | 0.72 | 0.80 | 0.73 |

Remarks: *Comparative Example,
**MIBK indicates methyl isobutyl ketone.

Organic polymer (i)

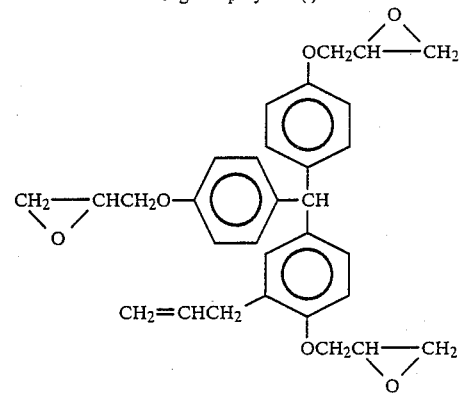

Organic polymer (ii)

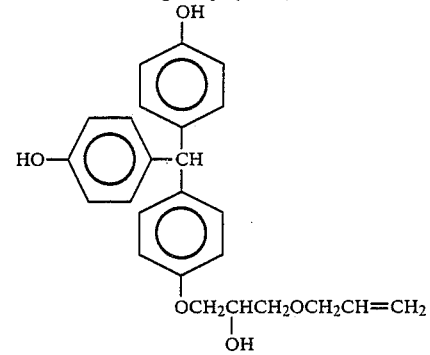

Organic polymer (iii)

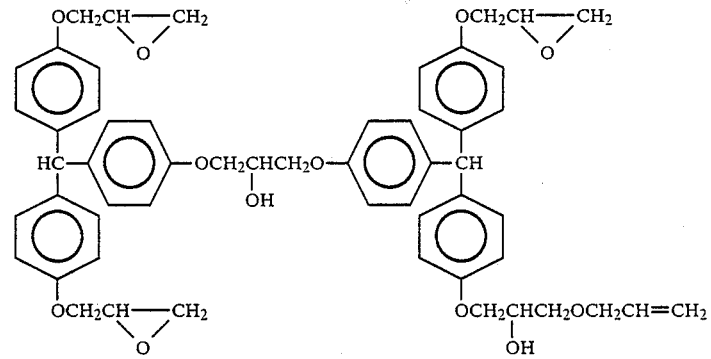

TABLE 1-continued

Organic polymer (iv)

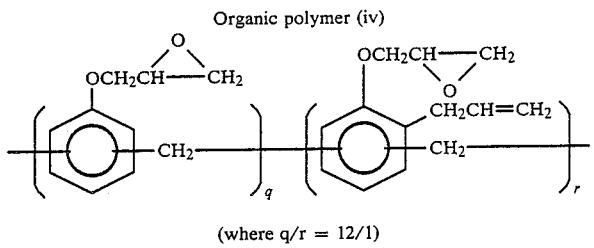

(where q/r = 12/1)

PRODUCTION EXAMPLES 5 TO 7

In the same four-neck flask as used in Production Example 1 to 4 were placed 75 g of the organic polymer (a compound (1) type) shown in Table 2, 0.05 g of triphenyl phosphine, and 200 g of diethylene glycol dimethyl ether. After complete dissolution of the organic polymer, 25 g of an organopolysiloxane represented by the formula below was added through the dropping funnel over about 20 minute, while keeping the flask at 130±5° C.

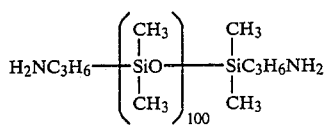

Reaction was continued at the same temperatures for 4 hours. The reaction product was removed by distillation washed with water and the solvent was under reduced pressure. Thus there were obtained three flask copolymers as shown in Table 2.

TABLE 2

| Production Example | 5 | 6 | 7* |
|---|---|---|---|
| Organic polymer | v | vi | vii |
| Block copolymer | V | VI | VII |
| Properties | Brown opaque solid | Brown opaque solid | Brown opaque solid |
| Viscosity of 50% MIBK solution (cs. 25° C.) | 20 | 21 | 18 |
| Ignition loss (%, 150° C./1 hr) | 0.93 | 0.87 | 0.88 |

Remarks: *Comparative Example,

Organic polymer (v)

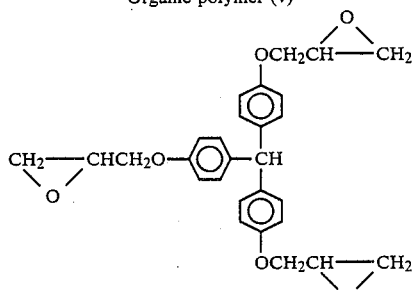

XD 7342 (a product of Dow Chemical)

Organic polymer (vi)

TABLE 2-continued

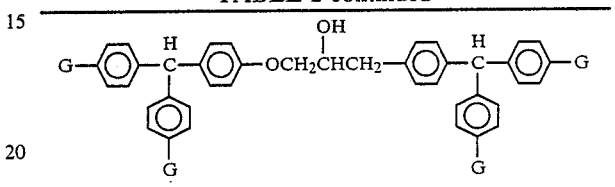

XD 9053 OOL (a product of Dow Chemical)
(In the above formula, G denotes —OCH$_2$CH——CH$_2$ with O bridging)

Organic polymer (vii)
Epoxidized cresol novolac
EOCN 1020-65 (a product of Nippon Kayaku)

EXAMPLES 1 TO 5 AND COMPARATIVE EXAMPLES 1 TO 3

Eight types of epoxy resin compositions were prepared by uniformly melting and mixing the components shown in Table 3 using a two-roll mixer. The thus obtained epoxy resin compositions were examined for the following six items of performance. The results are shown in Table 3.

(1) Spiral flow

Measured at 160° C. and 70 kg/cm$^2$ using a mold conforming to the EMMI standard.

(2) Mechanical properties (flexural strength and flexural modulus)

Measured using a specimen (10 by 4 by 100 mm) molded under the conditions of 160° C. 70 kg/cm$^2$, and 3 minutes, followed by post-curing at 180° C. for 4 hours, according to JIS K6911.

(3) Coefficient of expansion and glass transition point

Measured using a dilatometer. A specimen (4 mm in diameter and 15 mm long) was heated at a rate of 5° C. per minute.

(4) Crack resistance

Measured by subjecting IC package specimens (50 pieces) to 50 heat cycles, each cycle consisting of 1 minute at −196° C. and 30 seconds at 260° C. The specimen was prepared by bonding a silicon chip measuring 9.0 by 4.5 by 0.5 mm to a 14-pin IC frame (42 alloy), followed by molding with the epoxy resin composition at 160° C. for 3 minutes and post-curing at 180° C. for 4 hours.

(5) Deformation of aluminum electrodes

Measured by subjecting IC package specimens to 200 heat cycles, each cycle consisting of 1 minute at −196° C. and 30 seconds at 260° C. The specimen was prepared by bonding a silicon chip measuring 3.4 by 10.2 by 0.3 mm (provided with deposited aluminum electrodes) to a 14-pin IC frame (42 alloy), followed by molding with the epoxy esin composition at 180° C. for 2 minutes and post-curing at 180° C. for 4 hours.

(6) Warpage

A semiconductor device as shown in the figure was prepared by transfer molding under the conditions of 165° C., 70 kg/cm², and 2 minutes. Warpage (δ) that took place after post curing at 180° C. for 4 hours was measured. In the figures, there are shown glass epoxy resin 1, semiconductor element 2, and encapsulator 3.

TABLE 3

| Example No. | 1 | 2 | 3 | 4 | 5 | 1* | 2* | 3* |
|---|---|---|---|---|---|---|---|---|
| Epoxy cresol novolak resin | 28 | 46 | 30 | 29 | 28 | 30 | 29 | 58 |
| Phenol novolak resin | 33 | 15 | 31 | 32 | 33 | 31 | 32 | 35 |
| Brominated epoxy cresol novolak resin | 7 | 7 | 7 | 7 | 7 | 7 | 7 | 7 |
| Type of block copolymer | I | II | III | V | VI | IV | VII | — |
| Amount of block copolymer | 32 | 32 | 32 | 32 | 32 | 32 | 32 | — |
| Fumed silica | 290 | 290 | 290 | 290 | 290 | 290 | 290 | 290 |
| 3-Glycidoxypropyltrimethoxysilane | 1.5 | 1.5 | 1.5 | 1.5 | 1.5 | 1.5 | 1.5 | 1.5 |
| Carnauba wax | 1 | 1 | 1 | 1 | 1 | 1 | 1 | 1 |
| Carbon black | 1 | 1 | 1 | 1 | 1 | 1 | 1 | 1 |
| Triphenyl phosphine | 1 | 1 | 1 | 1 | 1 | 1 | 1 | 1 |
| Antimony trioxide | 10 | 10 | 10 | 10 | 10 | 10 | 10 | 10 |
| Spiral flow (inches) | 31 | 30 | 28 | 31 | 33 | 32 | 31 | 34 |
| Flexural strength (kg/mm²) | 13.7 | 13.2 | 13.3 | 13.4 | 13.6 | 12.9 | 12.8 | 13.8 |
| Flexural modulus (kg/mm²) | 1200 | 1230 | 1210 | 1240 | 1230 | 1250 | 1260 | 1350 |
| Coefficient of expansion (× $10^{-5}$/°C.) at 25 to 180° C. | 1.8 | 1.9 | 1.8 | 1.7 | 1.8 | 2.1 | 2.1 | 2.3 |
| Glass transition point (°C.) | 182 | 180 | 185 | 182 | 188 | 166 | 168 | 162 |
| Crack resistance (%) | 0 | 0 | 0 | 0 | 0 | 0 | 0 | 62 |
| Deformation of aluminum (μm) | 0 | 0 | 0 | 0 | 0 | 0.4 | 0.6 | 1.5 |
| Amount of warpage (μm) | 10 | 15 | 10 | 10 | 13 | 380 | 350 | 600 |

Remarks: *Comparative Examples; Quantities in parts by weight

It is noted from Table 3 that the epoxy resin composition of the present invention provides a cured product having a high glass transition point, good crack resistance, and a low coefficient of expansion. It is also noted that the epoxy resin composition as an encapsulator has a minimum of liability to deforming aluminum electrodes in a semiconductor device and to warping a semiconductor device.

What is claimed is:

1. An epoxy resin composition which comprises a curable epoxy resin, a curing agent, and a block copolymer formed by the reaction of a compound represented by the formula (1) below or an oligomer thereof,

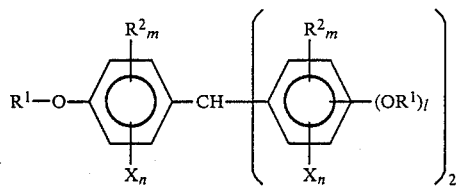
(1)

where $R^1$ denotes a hydrogen atom,

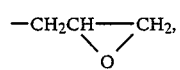

or a monovalent organic group; $R^2$ denotes a monovalent hydrocarbon group having 1 to 10 carbon atoms; X denotes a halogen atom; l denotes an integer of 1 or 2; m and n each denote an integer of 0 to 2; and $l+m+n \leq 5$ with an organopolysiloxane represented by the formula (2) below, $$R^3_a R^4_b SiO_{(4-[a+b])/2}$$ (2)

where $R^3$ denotes a hydrogen atom, haloen atom, hydroxyl group, alkoxyl group, or substituted monovalent hydrocarbon group; $R^4$ denotes monovalent organic group; $0.001 \leq a \leq 2$, $1 \leq b < 3$, and $1.001 \leq a+b \leq 3$.

2. The epoxy resin composition as claimed in claim 1, wherein the content of the block copolymer is 1 to 100 parts by weight per 100 parts by weight of the total amount of the curable epoxy resin and curing agent.

3. The epoxy resin composition as claimed in claim 1, wherein an inorganic filler is blended in an amount of from 100 to 1000 parts by weight per 100 parts by weight of the total of said curable epoxy resin and said curing agent.

4. The epoxy resin composition as claimed in claim 1, wherein $R^1$ of formula (1) is an alkenyl group.

5. The epoxy resin composition as claimed in claim 1, wherein $R^1$ of formula (1) is

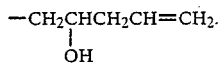

6. The epoxy resin composition as claimed in claim 1, wherein $R^1$ of formula (1) is $-CH_2CH=CH_2$.

7. The epoxy resin composition as claimed in claim 1, wherein $R^2$ of formula (1) is selected from the group consisting of methyl, ethyl, propyl, allyl, t-butyl, octyl and nonyl.

8. The epoxy resin composition as claimed in claim 1, wherein $R^3$ of formula (2) is a substituted monovalent hydrocarbon group selected from the group consisting of $-CH_2NH_2$, $-CH_2CH_2CH_2NH_2$,

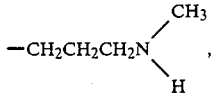

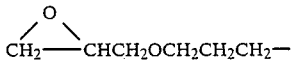

and $ClCH_2CH_2CH_2-$.

9. The epoxy resin composition as claimed in claim 1, wherein $R^4$ of formula (2) is a monovalent organic group selected from the group consisting of methyl, ethyl, phenyl and benzyl.

10. The epoxy resin composition as claimed in claim 1, further comprising a monoepoxy compound selected from the group consisting of styrene oxide, cyclohexene oxide, propylene oxide, methylene glycidyl ether, ethyl glycidyl ether, phenyl glycidyl ether, allyl glycidyl ether, octylene oxide, and dodecene oxide.

11. The epoxy resin composition as claimed in claim 1, wherein the curable epoxy resin is selected from the group consisting of epoxy novolak resin and alicyclic epoxy resin.

12. The epoxy rsin composition as claimed in claim 1, wherein the curable epoxy resin is in epoxy resin having halogen atoms.

13. The epoxy resin composition as claimed in claim 1, wherein the curing agent is selected from the group consisting of diaminodiphenyl-methane, diaminodiphenylsulfone, and metaphenylenediamine, phthalic anhydride, pyromellitic anhydride, benzophenone tetracarboxylic anhydride, phenol novolak, cresol novolak and triphenol alkanes.

14. The epoxy resin composition as claimed in claim 1, further comprising an accelerator for the curing agent.

15. The epoxy resin composition as claimed in claim 14, wherein the accelerator is selected from the group consisting of an imidazole, a tertiary amine, a phosphine and a cycloamidine.

16. The epoxy resin composition as claimed in claim 3, wherein the inorganic filler is selected from the group consisting of natural silica, synthetic high-purity silica, talc, mica, silicon nitride, boron nitride and alumina.

17. The epoxy resin composition claimed in claim 3 wherein the inorganic filler is synthetic spherical silica.

* * * * *